US010360067B1

(12) United States Patent
Wagner

(10) Patent No.: US 10,360,067 B1
(45) Date of Patent: Jul. 23, 2019

(54) DYNAMIC FUNCTION CALLS IN AN ON-DEMAND NETWORK CODE EXECUTION SYSTEM

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 15/472,078

(22) Filed: Mar. 28, 2017

(51) Int. Cl.
*G06F 9/48* (2006.01)
*G06F 9/455* (2018.01)

(52) U.S. Cl.
CPC ............ *G06F 9/4881* (2013.01); *G06F 9/455* (2013.01)

(58) Field of Classification Search
CPC ............................... G06F 9/455; G06F 9/4881
USPC ......................................................... 718/107
See application file for complete search history.

(56) References Cited

U.S. PATENT DOCUMENTS

| | | | | |
|---|---|---|---|---|
| 7,383,412 | B1 * | 6/2008 | Diard | G06F 9/52 711/170 |
| 8,156,484 | B2 * | 4/2012 | Smith | G06F 9/445 707/716 |
| 8,510,762 | B1 * | 8/2013 | Gregorio | G06F 8/36 717/104 |
| 8,732,309 | B1 * | 5/2014 | Richardson | G06Q 10/0631 709/226 |
| 9,215,096 | B2 * | 12/2015 | Vasudev | H04L 51/18 |
| 9,323,577 | B2 * | 4/2016 | Marr | G06F 9/5044 |
| 9,405,555 | B2 * | 8/2016 | Livshits | G06F 9/451 |
| 9,736,258 | B2 * | 8/2017 | Holland | H04L 67/2804 |
| 9,811,363 | B1 * | 11/2017 | Wagner | G06F 9/45516 |
| 9,811,434 | B1 * | 11/2017 | Wagner | G06F 9/45516 |
| 9,830,175 | B1 * | 11/2017 | Wagner | G06F 9/5077 |
| 9,830,449 | B1 * | 11/2017 | Wagner | G06F 21/53 |
| 9,928,108 | B1 * | 3/2018 | Wagner | G06F 9/45533 |
| 10,013,267 | B1 * | 7/2018 | Wagner | G06F 9/45558 |
| 10,061,613 | B1 * | 8/2018 | Brooker | G06F 9/5005 |

(Continued)

OTHER PUBLICATIONS

Christopher Brown • Marco Danelutto • Kevin Hammond • Peter Kilpatrick • Archibald Elliott: "Cost-Directed Refactoring for Parallel Erlang Programs"; Int J Parallel Prog (2014), 42:564-582.*

*Primary Examiner* — Francisco J Aponte
(74) *Attorney, Agent, or Firm* — Knobbe, Martens, Olson & Bear, LLP

(57) ABSTRACT

Systems and methods are described for providing dynamic function calls in an on-demand code execution system, whereby a task can be invoked on the on-demand code execution system based on functionality provided by the task, rather than an identifier of the task. The on-demand code execution system can enable tasks to register as providing a given functionality, and when a call is received to implement the functionality (e.g., from another task on the on-demand code execution system), the on-demand code execution system can select a task based on those registered. In some instances, the selected task may be based on a combination of execution cost of the task (e.g., compute costs utilized to execute the task) and invocation costs of the task (e.g., compute costs utilized to initiate execution of the task on the on-demand code execution system).

21 Claims, 6 Drawing Sheets

(56) References Cited

U.S. PATENT DOCUMENTS

| | | | | |
|---|---|---|---|---|
| 2006/0218277 | A1* | 9/2006 | Birkestrand | G06F 9/5061 709/226 |
| 2010/0070948 | A1* | 3/2010 | Rama | G06F 8/72 717/105 |
| 2013/0239128 | A1* | 9/2013 | Dawson | G06F 9/5027 719/320 |
| 2014/0257891 | A1* | 9/2014 | Richardson | G06Q 10/0631 705/7.12 |
| 2016/0041824 | A1* | 2/2016 | Bostick | G06F 8/75 717/123 |
| 2018/0053142 | A1* | 2/2018 | Martin | G06Q 10/087 |
| 2018/0113685 | A1* | 4/2018 | Gschwind | G06F 8/443 |

* cited by examiner

DYNAMIC FUNCTION CALLS IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
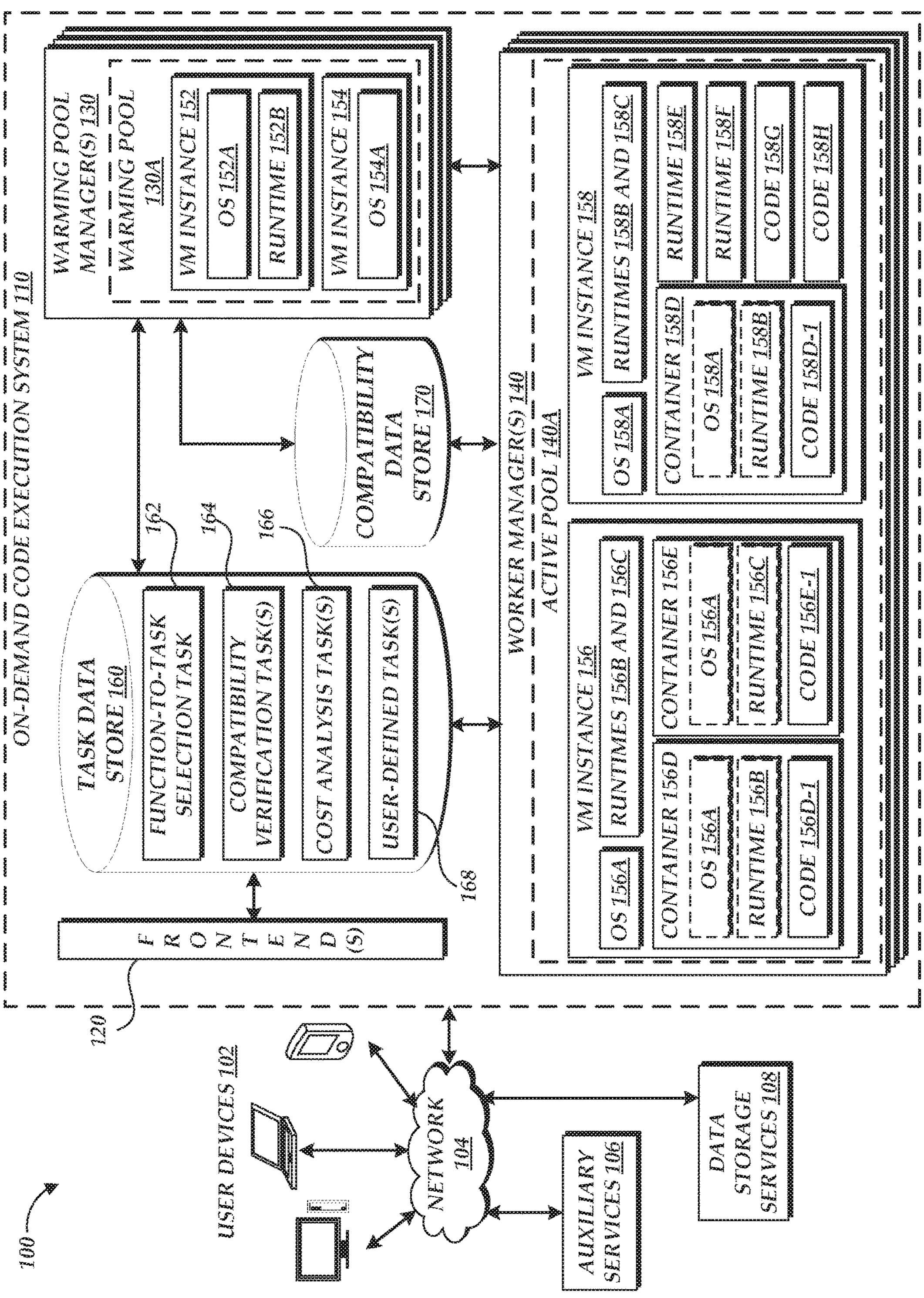
FIG. 1 is a block diagram depicting an illustrative environment in which an on-demand code execution environment can operate to execute tasks corresponding to code, which may be submitted by users of the on-demand code execution environment, and to enable executions of tasks to include a function call to a dynamically selected task on the on-demand code execution environment.

Generally described, aspects of the present disclosure relate to an on-demand code execution environment. The on-demand code execution environment enables rapid execution of code, which may be supplied by users of the on-demand code execution environment. The on-demand code execution environment further enables such code to call for execution of other code on the on-demand code execution environment, without directly specifying the code to be executed in response to the call. More specifically, aspects of the present disclosure enable the on-demand code execution environment to service calls to a dynamic function, to select code to implement the dynamic function according to a cost of initiating and execution that code, and to execute the selected code in order to implement a desired functionality of the dynamic function, without requiring the calling code to have knowledge of the particular code that is implemented. Thus, Illustratively, code submitted to the on-demand code execution environment may in some instances include generic or placeholder references to a desired functionality, and allow the on-demand code execution environment to select the most appropriate code to execute to achieve the desired functionality. For example, code submitted to the on-demand code execution environment may call a "transcode" function to transcode audio or video content, and the on-demand code execution environment may dynamically select code to execute in order to implement transcoding functionality in an efficient manner. In some instances, the on-demand code execution environment may utilize a current state of that environment to dynamically select code for execution, such that the code selected at each call to a "transcode" function may vary. For example, the cost (e.g., in terms of time or compute resources) of executing different sets of code may vary according to the state of the on-demand code execution environment, such as according to whether any given set of code is currently provisioned into an active execution environment or must be loaded into such an execution environment prior to execution. Accordingly, when a call to implement a desired functionality is received, the on-demand code execution system may utilize knowledge of the state of the on-demand code execution system to predict a least costly (e.g., in terms of time or compute resources) set of code to execute to implement the desired functionality. Thus, by use of calls to dynamically-selected code (which may also be referred to herein as a "dynamic function call"), the efficiency of operation of the on-demand code execution environment may be increased.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

In accordance with embodiments of the present disclosure, the on-demand code execution system may enable a task to include a dynamic function call, which when executed, causes the on-demand code execution system to select a task to execute to satisfy the function call according to an estimated or predicted efficiency of such execution (e.g., in terms of compute resources, such as memory, processing capacity, or bandwidth used). In one embodiment, the on-demand code execution system may implement a dynamic function call via a task, which may be referred to herein as a "function-to-task selection task." The function-to-task selection task may obtain a dynamic function call designating a desired functionality (which may correspond to any functionality achievable via code execution on the on-demand code execution system), and information (if any) required to achieve the desired functionality (e.g., parameters to use during execution of code to achieve the desired functionality). The function-to-task selection task may then execute in order to identify compatible tasks on the on-demand code execution system to implement the functionality, and determine an estimated or predicted efficiency of execution of the compatible tasks. The function-to-task selection task may then select a compatible task for execution, and cause execution of the task. In some instances, the function-to-task selection task may further return an output of the selected compatible task to a calling task. In this manner, tasks executing on the on-demand code execution system may be dynamically joined, such that a first task may call a second task without a priori knowledge of the second task. Moreover, the second task may vary across executions of the first task, without modifying the code of the first task. Thus, the efficiency of execution of the first task may be increased by the on-demand code execution system without requiring reconfiguration of the code of the first task itself. In some instances, such an increase in efficiency may be transient, such that a given execution of the first task is increased in efficiency due to a transient state of the on-demand code execution system, such as an increased ability to execute a second task using minimal compute resources. In other instances, such an increase in efficiency may be persistent or substantially persistent, such as when a new task is submitted to the on-demand code execution system that achieves a desired functionality at a lower cost than prior tasks. Thus, utilization of dynamic function calls can substantially improve the ability of the on-demand code execution system to execute tasks.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the limited nature of compute resources with which to execute code, the generally static nature of such code, the difficulty in maintaining code to make use of new techniques for improving code execution efficiency, and the changes in efficiency to code execution that may result from the varying state of a distributed on-demand code execution system. These technical problems are addressed by the various technical solutions described herein, including the implementation of a function-to-task selection task that may dynamically determine a task to execute in order to achieve a desired functionality. Thus, the present disclosure represents an improvement on existing data processing systems and computing systems in general.

The general execution of tasks on the on-demand code execution system will now be discussed. Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to retrieve data to be processed during execution of a task, and store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may correspond to code executable to implement "map" and "reduce" functions with respect to a data set.

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

In accordance with embodiments of the present disclosure, rather than utilizing a call to initiate execute of a known task, a dynamic function call may be used to initiate execution of a task selected by the on-demand code execution environment. The dynamic function call may indicate, for example, a desired functionality (e.g., video transcoding), as well as data to be processed according to that desired functionality (e.g., a video to be transcoded), and parameters to utilize in implemented the desired functionality (e.g., transcoding parameters). In one embodiment, the on-demand code execution system 110 may provide a number of pre-defined desired functionalities, and provide identifiers to utilize in making dynamic function calls to such desired functionalities. For example, the on-demand code execution system 110 may provide a task with access to a library including a variety of functions, each corresponding to a desired functionality, such that a call to the function (e.g., "transcode(video, parameters)") initiates selection and execution of a task on the on-demand code execution system 110 corresponding to the desired functionality. As another example, the on-demand code execution system 110 may provide an individual function enabling dynamic function calls to a variety of desired functionalities, according to the parameters of the call. Illustratively, the on-demand code execution system 110 may provide tasks with access to a "dynamic_invoke" function that may be passed parameters such as a desired functionality, data to be processed, and parameters for such processing (e.g., "dynamic_invoke(transcode, video, parameters)").

In one embodiment, a dynamic function call may be handled at least in part by a function-to-task selection task 162, which itself may be executed by the on-demand code execution system 110 as a task in accordance with the present disclosure. Illustratively, the function-to-task selection task 162 may include code that, when executed, implements the functionalities discussed herein, including identification of one or more candidate tasks that may be executed to implement a desired functionality and selection of a one or more such candidate tasks to execute in order to implement the desired functionality. In one embodiment, a single function-to-task selection task 162 may be utilized for all desired functionalities (e.g., as invoked by a "dynamic_invoke" function or the like). In another embodiment, multiple function-to-task selection tasks 162 may be provided, with each function-to-task selection task 162 being associated with a different desired functionality (e.g., a "transcode" function-to-task selection task 162, a "map_reduce" function-to-task selection task 162, a "encrypt" function-to-task selection task 162, etc.).

To enable selection of candidate tasks executable to implement a desired functionality, a function-to-task selection task 162 may in some instances utilize a compatibility verification task 164, corresponding to code executable to select one or more tasks executable to implement a desired functionality. Illustratively, where the on-demand code execution system 110 enables dynamic task calls for a pre-defined set of functionalities, one or more tasks (e.g., on submission of the individual tasks by users) may be registered as implementing a given functionality, and information regarding such functionalities may be stored within a compatibility data store 170. Thereafter, on receiving a call to implement a desired functionality, the function-to-task selection task 162 may initiate the compatibility verification task 164 to retrieve from the compatibility data store 170 for candidate tasks implementing a desired functionality. In another embodiment, the on-demand code execution system 110 may enable registration of tasks according to user-defined functionalities (e.g., any arbitrary string), and the compatibility verification task 164 may be executable to compare a functionality specified in a dynamic function call to the registered functionalities in the compatibility data store 170 to determine whether any tasks have registered as providing the desired functionality. Thus, the on-demand code execution system 110 may enable dynamic function calls for any number of user-defined functionalities. In some instances, the on-demand code execution system 110 may be configured to store functionalities according to a hierarchy, such that functionalities are grouped into classes that become more specific as the hierarchy is traversed. For example, a first tier may specify a general functionality (e.g., transcoding), a second tier may specify more particular functionality (e.g., a content type to be transcoded), and a third tier may specify even more particular functionality (e.g., a format supported for transcoding). Each tier may include one or more pre-defined functionalities, one or more user-defined functionalities, or both. In one embodiment, the compatibility verification task 164 may be supplied by an operator of the on-demand code execution system 110, such that each dynamic function call uses a common compatibility verification task 164. In another embodiment, users may be enabled to specify a compatibility verification task 164, such that operation of the compatibility verification task 164 may be varied according to code supplied by the user. For example, in addition to or as an alternative to querying for tasks registered to provide a desired functionality, a user-supplied compatibility verification task 164 may include customized compatibility checking, such as querying APIs of various candidate tasks to verify their ability to provide a desired functionality. Thus, any variety of compatibility verification tasks 164 may be utilized by a function-to-task selection task 162.

In addition, to one or more compatibility verification tasks 164, a function-to-task selection task 162 may utilize one or more cost analysis tasks 166 to assist in an estimated cost of executing a task to implement a desired functionality. In one embodiment, a cost analysis task 166 may correspond to code executable to analyze a candidate task and estimate a cost (e.g., in terms of compute resources) required for execution of the task. Illustratively, cost analysis may include static analysis (e.g., inspection of code corresponding to the task), dynamic analysis (e.g., analysis of past executions of the task), or a combination thereof. For example, a cost analysis task 166 may operate to obtain data regarding prior executions of a task (e.g., as included in log files of the on-demand code execution system 110), and estimate a cost (e.g., in terms of memory, processing cycles, or bandwidth) of executing the task to implement a desired functionality. In some instances, a cost analysis task 166 may utilize parameters passed to a dynamic function call to estimate the cost of execution of a candidate task. For example, the size of a video to be transcoded via a dynamic function call may be inspected by the cost analysis task 166 in order to determine the cost of executing a candidate task to transcode the video. In one embodiment, a cost analysis task 166 may be provided by an operating of the on-demand code execution system 110, and may operate to estimate costs associated with execution of a variety of tasks. In another embodiment, a cost analysis task 166 may be provided by a user of the on-demand code execution system 110 and associated with one or more tasks. For example, a user providing a first task to implement a desired functionality may also provide a corresponding cost analysis task 166 including code to estimate a cost of executing the first task. The function-to-task selection task 162 may in some instances implement functionality to ensure the accuracy of estimates provided by a user-supplied cost analysis task 166, such as modifying an estimate provided by the user-supplied cost analysis task 166 according to a past accuracy of estimates provided by the user-supplied cost analysis task 166 (e.g., such that if a given user-supplied cost analysis task 166 typically underestimates by a given percentage, the function-to-task selection task 162 increases future estimates proportionally).

In some embodiments, in addition to utilizing an estimated execution cost of a candidate task (which may reflect, for example, the compute resources required during actual execute of a candidate task), a function-to-task selection task 162 may additionally or alternatively select a task to execute based on an invocation cost of the task. The invocation cost may reflect, for example, the cost of compute resources required by the on-demand code execution system 110 to initiate execution of a task. Illustratively, the invocation cost may reflect bandwidth, processing power, and memory required to provision an execution environment with code of the task and any other dependencies of such code. Accordingly, the invocation cost may vary according to a state of the on-demand code execution system 110, such that execution of a task provisioned within an active container is associated with a low invocation cost, execution of a task provisioned within a "warmed" container is associated with a medium invocation cost, and execution of a task not yet provisioned in a container is associated with a high invocation cost. Illustratively, the function-to-task selection task 162 may combine both an estimated execution cost and an estimated invocation cost, and select a lowest-cost candidate function to implement a desired functionality corresponding to a dynamic function call. In this manner, dynamic function calls may not always result in execution of a task associated with a lowest execution cost, particularly in instances where an invocation cost of that task is high relative to other candidate tasks.

Each of the function-to-task selection tasks 162, the compatibility verification tasks 164, and the cost analysis tasks 166 may be stored in the task data store 160, which may also include one or more user-defined tasks 168. The task data store 160 may correspond to any persistent or substantially persistent data store, such as a hard drive (HDD), a solid state drive (SDD), network attached storage (NAS), a tape drive, or any combination thereof.

While embodiments are described herein with respect to dynamic function calls made during execution of a task, the on-demand code execution system 110 may further enable dynamic function calls to be made from user devices 102 or other network-connected devices external to the on-demand code execution system 110 (e.g., via an API call), or may request that the on-demand code execution system 110 initiate a dynamic function call in response to user-specified criteria (e.g., based on polling an auxiliary service 106, at various time intervals, etc.).

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

While some functionalities are generally described herein with reference to an individual component of the on-demand code execution system 110, other components or a combination of components may additionally or alternatively implement such functionalities. For example, while a worker manager 140 may operate to record the state of executions for a given execution identifier, a frontend 140 or virtual machine instance may additionally or alternatively record such state information.

Figure 2:
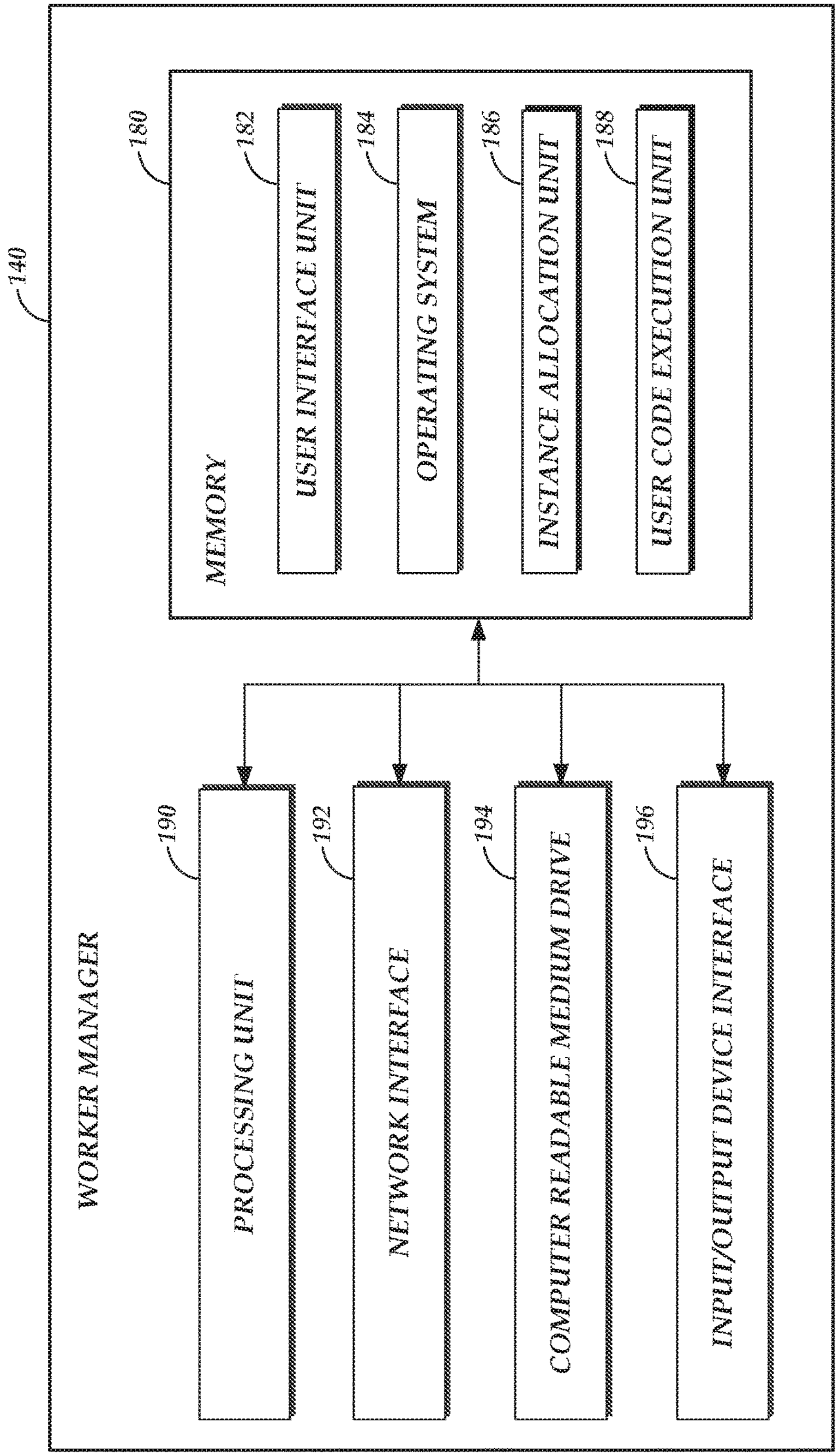
FIG. 2 depicts a general architecture of a computing device providing a worker manager that is configured to facilitate execution of tasks on the on-demand code execution environment of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3A:
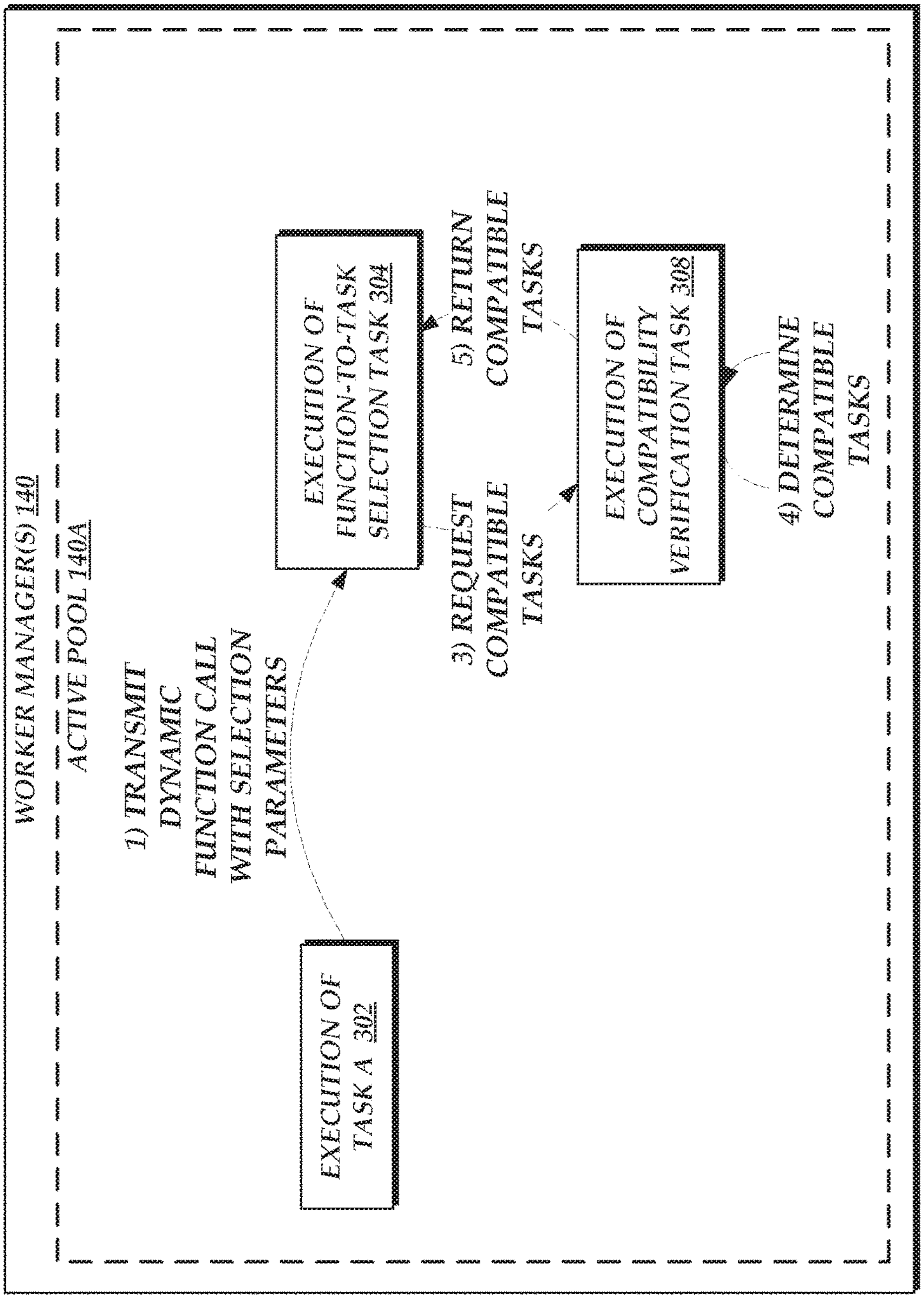
FIGS. 3A-3C are flow diagrams depicting illustrative interactions for enabling an execution of a first task to a call for execution of another task that is dynamically selected by the on-demand code execution environment.
Figure 3B:
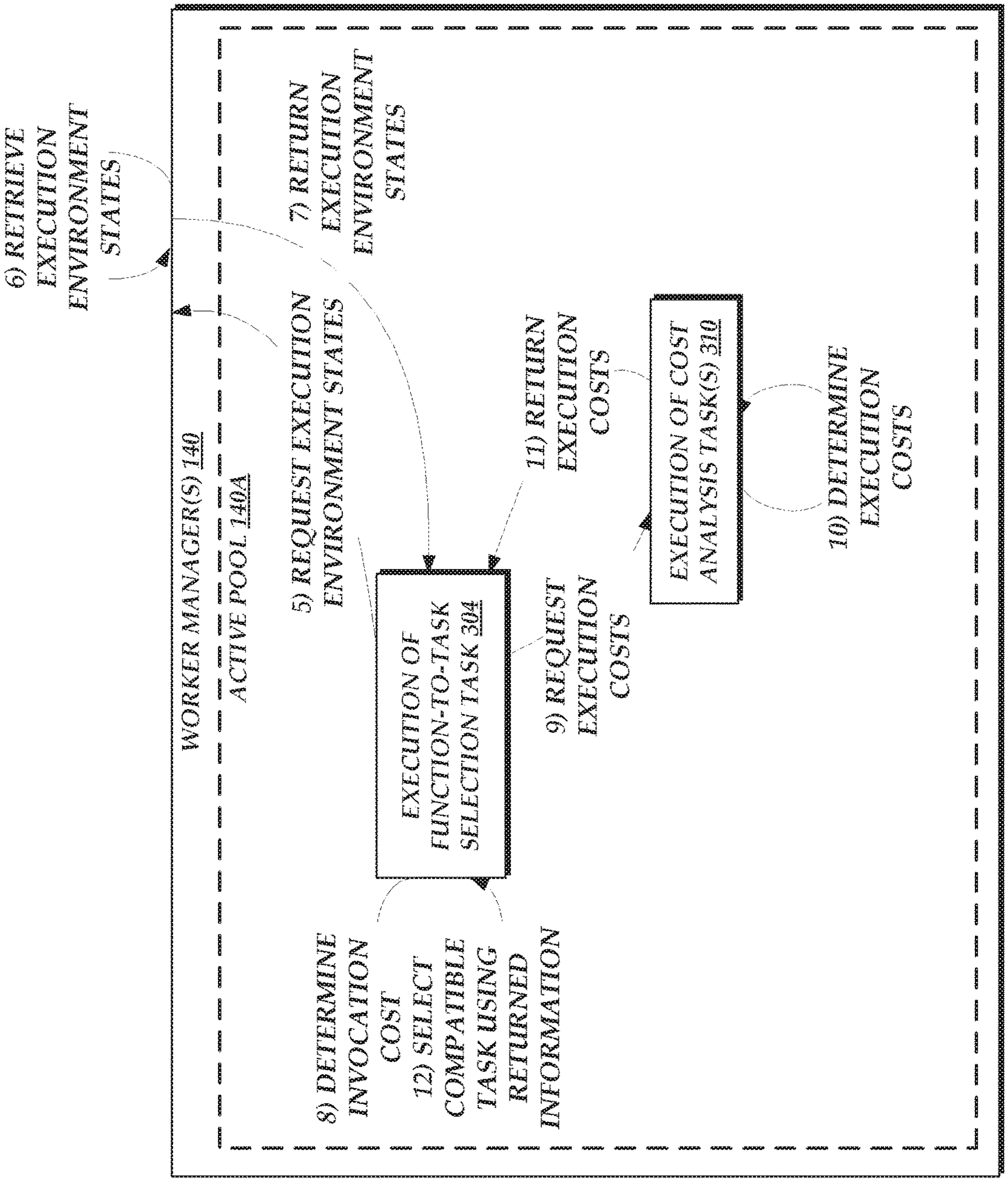
Figure 3C:
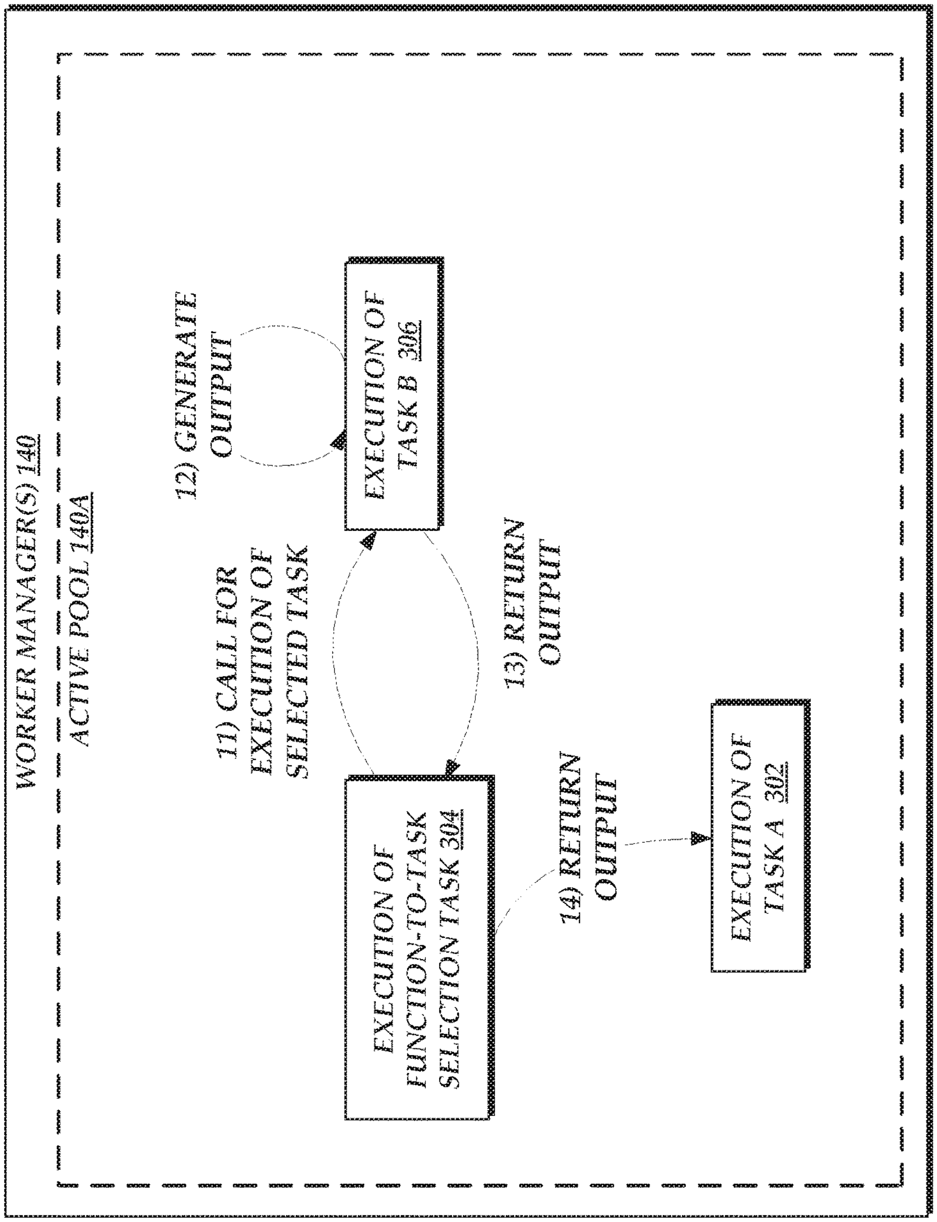

With reference to FIGS. 3A-3C, illustrative interactions are depicted for implementation of a dynamic function call at the on-demand code execution system 110. Specifically, the interactions of FIGS. 3A-3C can enable an execution of first task (designated as execution of task A 302) to call for execution of a function-to-task selection task 304, along with parameters indicating a desired functionality, and for the execution of a function-to-task selection task 304 to initiate an execution of a second task 306 in order to carry out the desired functionality, based on an estimated cost of the execution of a second task 306 (e.g., in terms of compute resources).

In describing FIGS. 3A-3C, reference will be made to communications between task executions, such as when a first task execution transmits a call to execute a second task. For brevity, FIGS. 3A-3C depict such communications as occurring directly between task executions. However, processing of such calls by the on-demand code execution system 110 may include additional interactions not shown in FIGS. 3A-3C. For example, a call from an execution of a first task to initiate execution of a second task may be processed by receiving the call at a frontend 120, distributing the call to a worker manager 140, generating an execution environment within an active pool 140A, and causing execution of the task within the execution environment. Further details regarding processing of calls between tasks, including reception of a call at a frontend 120, distribution of tasks to a worker manager 140, generation of an execution environment, and initiation of task executions, may be found in the '556 Patent, incorporated by reference above. Thus, one skilled in the art will appreciate that the interactions of FIGS. 3A-3C have been simplified for ease of description.

The interactions of FIGS. 3A-3C begin at (1) of FIG. 3A, where an execution of a first task 302 transmits a dynamic function call to an execution of a function-to-task selection task 304. While the dynamic function call is depicted in FIG. 3A as originating from an execution of a first task 302, the call may in other embodiments originate from a client computing device 102, an auxiliary service 106, or any other component capable of generating the call and transmitting the call to the frontend 120. In one embodiment, the call may be generated by the execution of a first task 302 in response to code of the first task 302. For example, such code may include a function call identifier, such as an identifier indicating a desired functionality (e.g., transcode( ), or an identifier associated with multiple potential desired functionalities (e.g., dynamic_function_call( ). The dynamic function call may include, for example, information designating a desired functionality (e.g., as a single identifier corresponding to a class of desired functionality or multiple identifiers corresponding to a class hierarchy of desired functionalities) and parameters to be passed to the desired functionality, such as data to be processed or parameters to utilize in processing the data. In some instances, the dynamic functional call may include additional information, such as identification of a compatibility verification task 164 to utilize in selecting candidate tasks for fulfilling the desired functionality, or an algorithm for estimating a cost of utilization of a candidate task (e.g., weights to be applied when calculating a cost from the estimated use of various compute resources).

At (3), the execution of the function-to-task selection task 304 transmits a request for compatible tasks, expected to implement the desired functionality specified within the dynamic function call, to an execution of a compatibility verification task 308 to determine a set of compatible tasks. The request may include, for example, one or more identifiers of the desired functionality as included within the dynamic function call. In one embodiment, the compatibility verification task may be provided by the on-demand code execution system 110. In another embodiment, the compatibility verification task may be provided by a user, such as the owner of task A. Where multiple compatibility verification tasks exist at the on-demand code execution system 110, the execution of the function-to-task selection task 304 may select an appropriate compatibility verification task using information from within the dynamic function call, or my select a default compatibility verification task.

At (4), the execution of the compatibility verification task 308 determines a set of compatible tasks, expected to be able to implement the desired functionality. Illustratively, the execution of the compatibility verification task 308 may inspect compatibility data (as may be stored, for example, in the compatibility data store 170) to determine one or more tasks registered as providing the desired functionality. In one embodiment, the on-demand code execution system 110 may enable a creator of a task to register the task as providing a given functionality, and include information as to such a registration in the compatibility data store 170. In some instances, the on-demand code execution system 110 may verify such functionality, such as by executing test instances of a task and verifying output of the task. As noted above, desired functionalities may be organized hierarchically, to aid in locating tasks associated with a desired functionality. Accordingly, the execution of the compatibility verification task 308 may compare one or more desired functionalities specified within the dynamic function call (e.g., "transcoding," "video," "MPEG-4 format") to a listing of tasks registered as providing the desired functionalities, to identify one or more compatible tasks.

In some instances, the execution of the compatibility verification task 308 may, in addition or as an alternative to utilizing a registration of desired functionalities, determine compatible tasks by inspecting other information regarding potential compatible tasks. For example, the on-demand code execution system 110 may provide the execution of the compatibility verification task 308 with access to information regarding APIs of potential compatible tasks, and the execution of the compatibility verification task 308 may inspect the APIs to verify compatibility of the task (e.g., to verify that appropriate inputs are handled by the API, that appropriate outputs are provided by the API, and that appropriate functions exist within the API). Because a compatibility verification task may correspond to code provided by a user, the functionality of a compatibility verification task may vary.

At (5), the execution of the compatibility verification task 308 returns identifying information of the one or more compatible tasks to the execution of the function-to-task selection task 304, which may then select one or more compatible tasks for execution based on an estimated cost of the tasks.

The interactions of FIG. 3A are continued in FIG. 3B, where the execution of the compatibility verification task 308, at (5), transmits a request to a worker manager 140 for information regarding a state of the execution environments managed by the worker manager (e.g., environments within the active pool 140A and a warming pool 130A). The state information may be gathered by the worker manager 140 at (6), and returned to the execution of the function-to-task selection task 304 at (7). In some instances, the worker manager 140 may retrieve a portion of the state information from a warming pool manager 130. In other instances, the execution of the function-to-task selection task 304 may retrieve state information from the warming pool manager 130, or the state information may omit information regarding a state of the warming pool 130A.

As noted above, the state of execution environments may effect a computational cost of a task execution (e.g., the computational time or resources required to execute a task), particularly with respect to a cost of computational resources required to initiate the execution. For example, where the active pool 140A includes a virtual machine instance or software container provisioned with code of a task, which is available for use in a new execution of the task, the computational cost to invoke the task on the on-demand code execution system 110 may be low. Where the active pool 140A does not include such a virtual machine instance or software container, but a warming pool 130A does, the computational cost to invoke the task may be relatively higher. Where neither the active pool 140A nor the warming pool 130A includes an execution environment provisioned with code of the task, the computational cost to invoke a task may progressively increase according to the state of the on-demand code execution system 110. For example, computational costs may be low when an execution environment exists within the pools 140A or 130A provisioned with dependencies of a task (e.g., a runtime environment for the task) and may increase proportional to the computational resources required by the on-demand code execution system 110 to provision such an execution environment with those dependencies (including, for example, the code of the task itself).

Accordingly, at (8), the execution of the function-to-task selection task 304 determines an invocation cost of each compatible task (tasks potentially used to fulfill the desired functionality specified in the dynamic function call of FIG. 3A). In one embodiment, the execution of the function-to-task selection task 304 may assign static invocation costs according to a state of the on-demand code execution system 110 (e.g., a cost of a if an execution environment is available in the active pool 140A and provisioned with code of the task and any other dependencies, a cost of b if an execution environment is available in the active pool 140A and provisioned with a dependency of the task, such as a runtime environment, but not with code of the task itself, a cost of c if an execution environment is available in the warming pool 130A and provisioned with code of the task and any other dependencies, etc.). In other embodiments, the invocation costs assigned may be determined based on historical analysis of invocations at the on-demand code execution environment, such as a historical analysis of the computational resources used to invoke a task under a given state of the on-demand code execution system 110.

In addition to invocation cost, the execution of the function-to-task selection task 304 may estimate an execution cost of each compatible task, corresponding to a computational cost (e.g., in time and compute resources) to execute the task, once execution is initiated within an execution environment of the on-demand code execution system 110. To assist in estimation of an execution cost, the execution of the function-to-task selection task 304 may utilize one or more cost analysis tasks 310. In one embodiment, a distinct cost analysis task 310 may be executed for each compatible task identified as potentially providing the desired functionality a dynamic function call. For example, a creator of each compatible task may provide, along with the compatible task, a corresponding cost analysis task 310 that functions to analyze potential inputs to the compatible task (e.g., data to be processed and parameters for such processing), and provide an estimated computational cost for executing the compatible task with the potential inputs. In another embodiment, or where a creator of a compatible task has not provided a cost analysis task corresponding to the compatible task, the on-demand code execution system 110 may provide a cost analysis task configured to estimate an execution cost of a compatible task. Accordingly, the execution of the function-to-task selection task 304 may, at (9), request an estimated execution cost for a compatible task from executions of one or more cost analysis tasks 310.

At (10), the execution of the cost analysis task 310 may determine an estimated execution cost for one or more compatible tasks. In one embodiment, the execution of the cost analysis task 310 may use static analysis (e.g., an inspection of code corresponding to the task) to estimate computational costs. In another embodiment, the execution of the cost analysis task 310 may use dynamic analysis (e.g., inspection of historical data corresponding to the task or similar tasks) to estimate computation costs. The static or dynamic analysis may be based at least in part on inputs that would be provided to the compatible task, as included in the dynamic function call. For example, where a dynamic function call requests transcoding of a given video file according to a set of parameters, an execution of a cost analysis task 310 may inspect historical data for a corresponding transcoding task to estimate that the transcoding task would take n ms to transcode the video file, and utilizing m megabytes of RAM while doing so. Thereafter, at (11), the estimate execution cost for the compatible task may be returned to the execution of the function-to-task selection task 304.

At (12), the function-to-task selection task 304 selects a compatible task for execution, in order to implement the desired functionality of the dynamic function call. In one embodiment, the function-to-task selection task 304 may combine the estimated invocation cost of a compatible task (e.g., the computational cost to initiate execution of the compatible task on the on-demand code execution system 110) and the estimated execution cost of the compatible task (e.g., the computational cost of executing the compatible task to implement the desired functionality) to result in a total estimated computational cost for each compatible task.

The function-to-task selection task 304 may then select a compatible task with a lowest estimated computational cost to implement the desired functionality.

In some instances, the function-to-task selection task 304 may combine multiple computational cost metrics (e.g., time, processing cycles, memory usage, bandwidth usage, etc.) according to weightings of such metrics, which weightings may be pre-defined or specified by a user, such as within the dynamic function call. Further, the function-to-task selection task 304 may adjust parameters of the estimated computational cost (e.g., the estimated execution cost, the estimated invocation cost, or individual metrics of such costs) based on historical values. For example, where historical estimated execution costs for an individual task are typically below actual execution costs, the function-to-task selection task 304 may adjust the estimated execution cost to account for such inaccuracies. Such adjustments may be useful, for example, where estimated execution costs are provided by user-defined cost analysis tasks. In some instances, the function-to-task selection task 304 may assign a score to each compatible task, based on an estimated computational cost and other factors. For example, the on-demand code execution system 110 may enable users to assign ratings to compatible tasks, and the function-to-task selection task 304 may assign a score to each compatible task based on a combination of a rating for the compatible task and the estimated computational cost for the task. The function-to-task selection task 304 may then select a compatible task according to the assigned scores.

The interactions of FIG. 3B are then continued in FIG. 3C, where the execution of the function-to-task selection task 304 calls for execution of the selected task, referenced in FIG. 3C as task B. The execution of the function-to-task selection task 304 may pass to the execution of task B 306 any parameters included within the dynamic function call, such as data to be processed by the execution of task B 306 and parameters for such processing. The execution of task B 306 may then proceed to implement the desired functionality according to the code of task B. For purposes of description, it will be assumed that the execution of task B 306 generates an output to be returned to the execution of task A 302, as a return to the dynamic function call. Thus, at (12), the execution of task B 306 may generate an output, and return the output to the execution of the function-to-task selection task 304 at (13) (e.g., as a return value to a function call corresponding to the execution of task B 306). At (14), the execution of the function-to-task selection task 304 returns the output to the execution of task A 302, thereby enabling the execution of task A 302 to call for implementation of a desired functionality without a priori knowledge of a task that implements the functionality, and resulting in execution of a task to minimize computational costs on the on-demand code execution system 110.

While the interactions of FIG. 3C depict a return of output from the execution of task B 306 to the execution of the function-to-task selection task 304 and then to the execution of task A 302, other interactions are possible. For example, in some instances an execution of task B 306 may generate no return value, or may return output via a different mechanism, such as by posting the output to a network-accessible storage location. As a further example, some embodiments of the function-to-task selection task 304 may redirect an output of the execution of task B 306 directly to the execution of task A 302, thus allowing the execution of the function-to-task selection task 304 to halt, without awaiting the output of the execution of task B 306. Various other modifications to the interactions of FIGS. 3A-3C are contemplated. For example, while the function-to-task selection task 304 is illustrated as utilizing a distinct task compatibility task 308 and cost analysis tasks 310, in some embodiments the function-to-task selection task 304 may carry out functionalities of these distinct tasks 308 and 310 itself. One skill in the art will appreciate that other modifications to the interactions of FIG. 3A-3C are possible.

Figure 4:
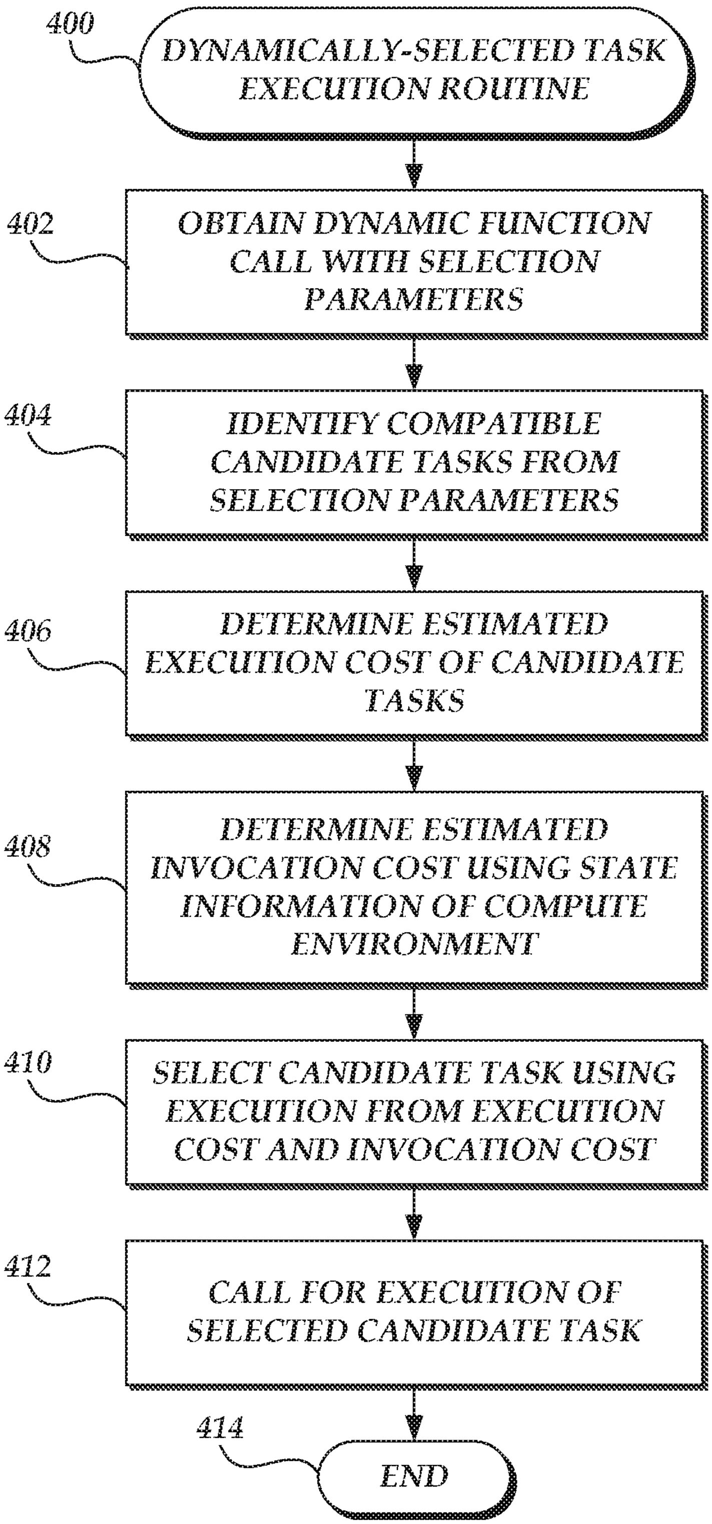
FIG. 4 is a flow chart depicting an illustrative routine for enabling calls to dynamically selected function an on-demand code execution environment to process data sets according to the MapReduce programming model, at least partly by use of a coordinator implemented as one or more tasks within the on-demand code execution environment.

With reference to FIG. 4, a block diagram will be described depicting an illustrative routine 400 for implementing dynamic function calls on an on-demand code execution system. The routine 400 may be implemented, for example, as a task on the on-demand code execution system 110. The routine 400 begins at block 402, where the on-demand code execution system 110 obtains a dynamic function call, including selection parameters for selecting a task to implement a desired functionality. The selection parameters may include, for example, an identifier of the desired functionality, inputs to the task, or parameters for selection of the task (e.g., a compatibility verification task to be used in identifying compatible tasks implementing the desired functionality).

At block 404, the on-demand code execution system 110 identifies a set of compatible candidate tasks, which may potentially be used to implement the desired functionality. Illustratively, the on-demand code execution system 110 may compare an identifier of the desired functionality, as included in the dynamic task call, with registered functionalities provided by tasks on the on-demand code execution system 110, to result in a set of tasks purported to implement the desired functionalities. As noted above, identifiers of desired functionalities may in some instances be pre-defined, or may be created by virtue of registration of a task to implement the desired functionality. Identifiers may, for example, be organized into hierarchies of desired functionalities. In some instances, the on-demand code execution system 110 may additionally or alternatively implement a user-specified compatibility verification task, corresponding to code executable to inspect information (e.g., API information) regarding candidate tasks, to verify their ability to implement the desired functionality.

At block 406, the on-demand code execution system 110 determines an execution cost of each candidate task (as identified at block 404). The execution cost may include an estimated usage of one or more computational resources, or an estimated time required to execute the task to implement the desired functionality. The execution cost may be determined, for example, by static or dynamic analysis of code corresponding to the candidate task, such as by estimating an execution time and resource usage from prior executions of the candidate task provided with similar inputs. In some instances, execution cost may be determined by execution of a cost analysis task corresponding to the candidate task, which cost analysis task may be provided by an owner or submitter of the candidate task. The on-demand code execution system 110 may adjust estimated cost values obtained from such a cost analysis task, for example to account for historical inaccuracies in the estimated values.

At block 408, the on-demand code execution system 110 determines an invocation cost of each candidate task, representing a computational cost (e.g., time or amounts of computational resources) required to initiate execution of a candidate task on the on-demand code execution system 110. The invocation cost may be distinct from the execution cost, and represent, for example, a time or amount of compute resources required to provision an execution environment with dependencies of a task and begin execution of the task within the execution environment. In one embodiment, the invocation cost may correspond to a pre-determined value, based on a state of the on-demand code execution system 110 with respect to the task. For example, a first value invocation cost may indicate an execution environment is available and provisioned with all required dependencies of the task, a second value invocation cost may indicate that an execution environment is available and provisioned with some dependencies of the task, a third value invocation cost may indicate that an execution environment is not yet available in an active pool but is available in a warming pool, and a fourth value invocation cost may indicate that no execution environment is currently available in an active pool or a warming pool. In another embodiment, invocation costs may be based at least in part on historical analysis of computational costs required to initiate invocation of a candidate task, given a state of the on-demand code execution system 110.

At block 410, the on-demand code execution system 110 selects a candidate task to implement the desired functionality, based on the determined execution costs and invocation costs. For example, the on-demand code execution system 110 may combine the cost metrics of the execution costs and invocation costs, and combines the cost metrics into a total cost according to a weighting. The on-demand code execution system 110 may then select a lowest cost candidate task to implement the desired functionality. In one embodiment, the cost metrics and weights for combining such metrics are pre-defined by the on-demand code execution system 110. In another embodiment, the cost metrics and weights may be specified by a user (e.g., within a dynamic function call). For example, a user may specify, within a dynamic function call, that a candidate task should be selected to minimize processing time (e.g., such that a combined invocation time and execution time is minimized). As another example, a user may specific, within a dynamic function call, that a candidate task should be selected to minimize memory usage, or to minimize a combination of memory usage and processing cycles when combined according to a given weighting. In some instances, cost metrics and weights may specify how metrics of different types should be combined to result in a total cost. For example, where a user wishes to minimize invocation time and memory usage during execution, a dynamic function call may include an algorithm by which an estimated time to invoke a task may be combined with an estimated memory usage during execution to result in a total cost of the task. Various other rankings or mechanisms will be apparent to one skilled in the art in light of the present disclosure. For example, where the on-demand code execution system 110 provides functionality for users to rate or review candidate tasks, a candidate task may be selected based at least in part on that rating.

Thereafter, at block 412, the on-demand code execution system 110 calls for execution of the selected candidate task, in order to implement the desired functionality as specified in the dynamic function call. Illustratively, the on-demand code execution system 110 may initiate an execution of the selected candidate task, and pass to the task parameters specified within the dynamic function call. Thus, a task executing on the on-demand code execution system 110 is enabled to implement a desired functionality without specifying a particular task to implement the functionality, and to dynamically select an appropriate task at runtime, based on the availability of the on-demand code execution system 110 to implement the appropriate task. The routine 400 may then end at block 414.

The blocks of the routine 400 described above may vary in embodiments of the present disclosure. For example, in some implementations, the on-demand code execution system 110 may function, after calling for execution of a candidate task, to obtain a return value of the candidate task, and provide the return value to a calling task (which transmitted the dynamic function call). As another example, the on-demand code execution system 110 may in some instances be configured to select multiple candidate tasks, and execute such multiple tasks (e.g., concurrently). For example, where a calling task is configured to attempt to verify the output of a dynamic function call, it may request (e.g., as a parameter to the dynamic function call) that two candidate tasks are selected and executed in response to the call. The calling task may then verify the outputs of each executed candidate task by comparing the outputs. Other variations to the routine 400 are possible.

While various examples of metrics are described herein for utilization in determining a task to execute in response to a dynamic function call, additional or alternative metrics may be utilized. For example, in some instances it may be desirable to either or both the on-demand code execution system or a user (e.g., a caller of a dynamic function call or an owner of a task) to minimize specific actions undertaken by the task selected to fulfill a dynamic function call. For example, it may be beneficial to minimize "calls" from the task, either to execute other tasks or to network-accessible services, e.g., to avoid throttling of such calls or use of a quota associated with such calls. Accordingly, calls from a task execution may be included within an execution cost of the task, potentially independently of the computing resources, such as bandwidth, that would be utilized to implement the calls. As another example, it may be beneficial to minimize the number of physical host computing devices used to service calls at the on-demand code execution system, such as to reduce power usage of the system. Accordingly, either or both invocation costs or execution costs may account for a location of the execution environment expected to be utilized to execute a task in response to a dynamic function call (e.g., where a location collocated with many other execution environments is more preferable than a location with fewer other execution environments). Similarly, it may be beneficial to maintain utilization rates of computing devices within the on-demand code execution system at a specific level (e.g., 80% processor or memory usage), and invocation or execution costs of a candidate task may be evaluated based on their expected effect on utilization rates of computing resources at an execution environment. Thus, the execution and invocation metrics described herein are intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to implement dynamic function calls in an on-demand code execution system, wherein the on-demand code execution system generates one or more execution environments in which to execute tasks corresponding to computer-executable code, the system comprising:

a non-transitory data store configured to store information identifying a set of tasks implementing a functionality, individual tasks of the set of tasks corresponding to code executable on the on-demand code execution system to implement the functionality; and one or more processors in communication with the non-transitory data store and configured with computer-executable instructions to:

obtain a dynamic function call requesting implementation of the functionality;

utilize the information of the non-transitory data store to identify the set of tasks as candidate tasks for satisfying the dynamic function call;

determine, based at least in part on historical data regarding executions of individual tasks within the set of tasks, estimated execution metrics of the individual tasks, wherein the estimated execution metrics indicate at least one of estimated amounts of time or estimated amounts of a compute resource used to execute the individual tasks;

determine, based at least in part on a state of the one or more execution environments, estimated invocation metrics of the individual tasks, wherein the estimated invocation metrics indicate at least one of estimated amounts of time or estimated amounts of a compute resource used to initiate executions of the individual tasks on the on-demand code execution system;

select a task of the set of tasks to implement the functionality based on inputs comprising at least the estimated executions metrics of the individual tasks and the estimated invocation metrics of the individual tasks; and initiate execution of the task on the on-demand code execution system to implement the functionality requested in the dynamic function call.

2. The system of claim 1, wherein the one or more processors are configured with the computer-executable instructions by execution of a function-to-task selection task on the on-demand code execution system.

3. The system of claim 1, wherein one or more execution environments include at least one of a virtual machine instance or a software container.

4. The system of claim 1, wherein the one or more processors are further configured with the computer-executable instructions to obtain an output of the task and return the output to a source of the dynamic function call.

5. Non-transitory computer readable media including computer-executable instructions to implement dynamic function calls in an on-demand code execution system, wherein the on-demand code execution system generates one or more execution environments in which to execute tasks corresponding to computer-executable code, and wherein the computer-executable instructions, when executed by a processor of the on-demand code execution system, cause the processor to:

obtain a dynamic function call requesting implementation of a functionality;

identify a set of tasks on the on-demand code execution system implementing the functionality, wherein individual tasks of the set of tasks correspond to code executable on the on-demand code execution system;

select a task of the set of tasks to implement the functionality based at least in part on estimated execution metrics of the individual tasks, wherein the estimated execution metrics indicate uses of the on-demand code execution system to execute the individual tasks, and wherein the estimated execution metrics are determined based at least in part on at least one of historical data regarding executions of individual tasks within the set of tasks, static analysis of code corresponding to individual tasks of the set of tasks, or invocation of cost analysis tasks corresponding to individual tasks of the set of tasks; and initiate execution of the task on the on-demand code execution system to implement the functionality requested in the dynamic function call.

6. The non-transitory computer-readable media of claim 5, wherein the computer-executable instructions cause the processor to determine the estimated execution metrics.

7. The non-transitory computer-readable media of claim 6, wherein the computer-executable instructions further cause the processor to select the task based at least in part on estimated invocation metrics of the individual tasks, wherein the estimated invocation metrics indicate at least one of estimated amounts of time or estimated amounts of a compute resource used to initiate executions of the individual tasks on the on-demand code execution system.

8. The non-transitory computer-readable media of claim 7, wherein the estimated invocation metrics indicate at least one of a time or amount of computing resources used to generated execution environments in which to execute the individual tasks and to provision the execution environments with dependencies of the individual tasks.

9. The non-transitory computer-readable media of claim 5, wherein the computer-executable instructions cause the processor to identify the set of tasks on the on-demand code execution system implementing the functionality based at least in part on inspection of registration data of the set of tasks, the registration data indicating that individual tasks of the set of tasks are registered with the on-demand code execution system as providing the functionality.

10. The non-transitory computer-readable media of claim 5, wherein the computer-executable instructions cause the processor to identify the set of tasks on the on-demand code execution system implementing the functionality based at least in part on initiating execution of a compatibility verification task specified in the dynamic function call.

11. The non-transitory computer-readable media of claim 7, wherein the computer-executable instructions cause the processor to select the task of the set of tasks to implement the functionality based at least in part on a cost value calculated from a combination of the estimated executions metrics of the individual tasks and the estimated invocation metrics of the individual tasks.

12. The non-transitory computer-readable media of claim 11, wherein the cost value is calculated by weighing the estimated executions metrics and the estimated invocation metrics according to one or more weights included in the dynamic function call.

13. The non-transitory computer-readable media of claim 5, wherein the dynamic function call is obtained from at least one of the on-demand code execution system or a device external to the on-demand code execution system.

14. A computer-implemented method to implement dynamic function calls in an on-demand code execution system, wherein the on-demand code execution system generates one or more execution environments in which to execute tasks corresponding to computer-executable code, the computer-implemented method comprising:

obtaining a dynamic function call requesting implementation of a functionality;

identifying a set of tasks on the on-demand code execution system implementing the functionality, wherein individual tasks of the set of tasks correspond to code executable on the on-demand code execution system;

determining, based at least in part on a state of the one or more execution environments, estimated invocation metrics of the individual tasks, wherein the estimated invocation metrics indicate uses of the on-demand code execution system to initiate executions of the individual tasks;

determining estimated execution metrics of the individual tasks, wherein the estimated execution metrics indicate at least one of estimated amounts of time or estimated amounts of a compute resource used to execute the individual tasks;

selecting a task of the set of tasks to implement the functionality based at least in part on the estimated invocation metrics of the individual tasks and on the estimated execution metrics; and initiating execution of the task on the on-demand code execution system to implement the functionality requested in the dynamic function call.

15. The computer-implemented method of claim 14, wherein the estimated invocation metrics indicate at least one of estimated amounts of time or estimated amounts of a compute resource used to initiate executions of the individual tasks.

16. The computer-implemented method of claim 14, wherein selecting the task of the set of tasks to implement the functionality comprises selecting multiple tasks to implement the functionality.

17. The computer-implemented method of claim 14, wherein selecting the task of the set of tasks to implement the functionality is further based at least in part on ratings of the individual tasks.

18. The computer-implemented method of claim 14, wherein determining estimated execution metrics of the individual tasks comprises at least one of analyzing historical data regarding executions of the individual tasks or executing a cost analysis task corresponding to at least one task of the set of tasks.

19. The computer-implemented method of claim 14, wherein the method is implemented by a processor of the on-demand code execution system configured with instructions corresponding to a task to implement dynamic function calls.

20. The computer-implemented method of claim 14 further comprising obtaining an output of the task and return the output to a source of the dynamic function call.

21. The computer-implemented method of claim 14, wherein the state of the one or more execution environments includes data loaded into the one or more execution environments, the data corresponding to a dependency of at least one task of the set of tasks.

* * * * *